Jan. 20, 1970    L. A. KOPASKA    3,490,491
COUPLING DEVICE

Filed Feb. 13, 1967    2 Sheets-Sheet 1

INVENTOR
LARRY A. KOPASKA
BY
Deck, Zarley, McKee & Thomte
ATTORNEYS

Jan. 20, 1970  L. A. KOPASKA  3,490,491
COUPLING DEVICE
Filed Feb. 13, 1967  2 Sheets-Sheet 2
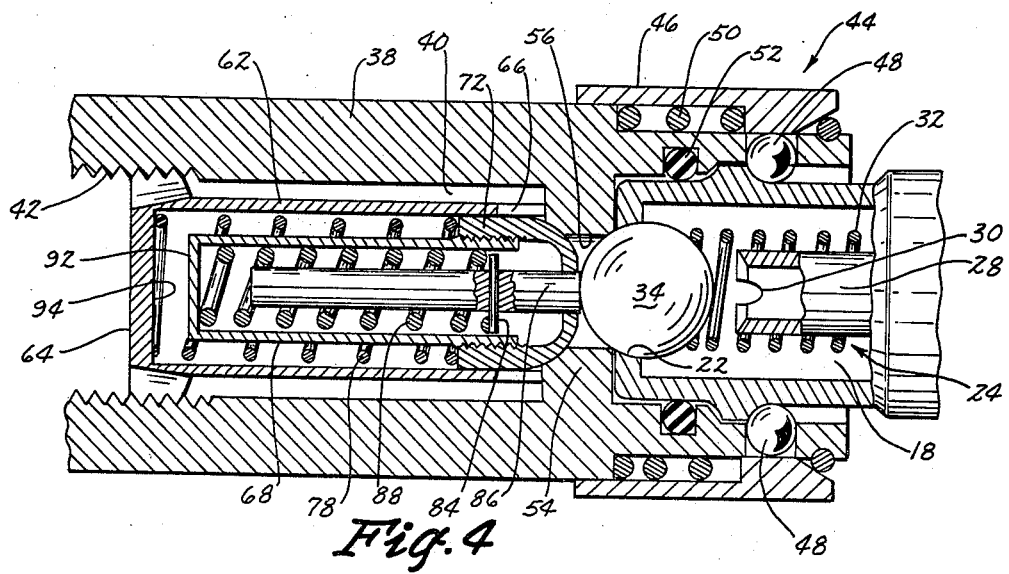
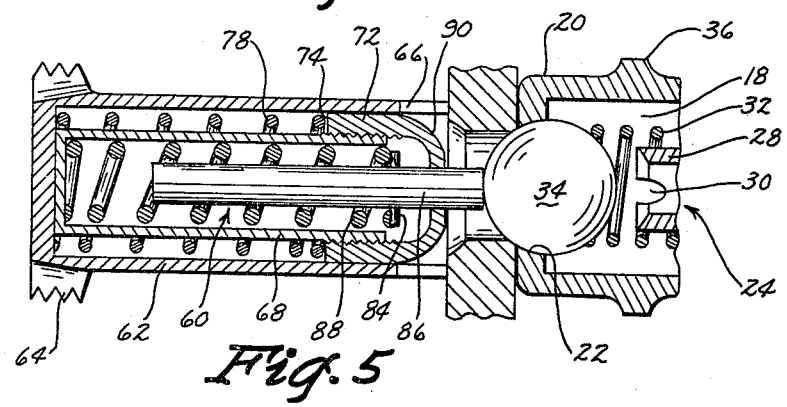
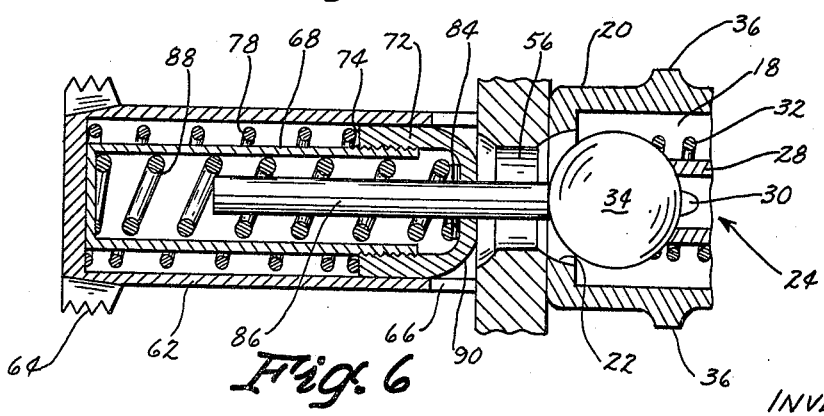
INVENTOR
LARRY A. KOPASKA
BY
Duck, Zarley, McKee & Thomte
ATTORNEYS

United States Patent Office 3,490,491
Patented Jan. 20, 1970

3,490,491
COUPLING DEVICE
Larry A. Kopaska, Guthrie Center, Iowa 50115
Filed Feb. 13, 1967, Ser. No. 615,456
Int. Cl. F16k *15/00;* F16l *37/28*
U.S. Cl. 137—614.05
8 Claims

ABSTRACT OF THE DISCLOSURE

A coupling device for detachably connecting first and second conduits which are in communication with a source of hydraulic fluid under pressure and an apparatus to be powered by the hydraulic fluid, respectively, the second conduit including a check valve means, and an actuator means in the coupling device to permit the connection of the conduits when one or more thereof is under pressure, the actuator means also adapted to unseat the check valve at times and also adapted to prevent the undesirable seating of the check valve during the operation of the equipment to which the conduits are connected.

---

Coupling devices are commonly used to effect the connection of a tractor hydraulic line to an implement hydraulic line. Existing coupling devices are extremely difficult to effect the connection thereof when one or both of the tractor or implement hydraulic lines are under pressure. To effect the connection of the large majority of existing coupling devices, when both the tractor and implement lines are under pressure, the line in the tractor valve must be closed to release the pressure on the tractor line. However, since most of the tractor valves automatically return to a neutral position to again impose pressure on the tractor line, it is necessary to hold the tractor valve in the closed condition. One must then assemble the tractor line coupling to the equipment line coupling with one hand and this is obviously extremely difficult. After this has been done, the hydraulic valve on the tractor line is then open to make the coupling operational.

Also, even after the ball valves in the tractor and implement fittings have been unseated to permit the connection thereof, a surge in the hydraulic pressure either in the tractor line or implement line will sometimes cause one of the ball valves to become "frozen" on its valve seat.

Therefore, it is a principal object of this invention to provide a coupling device which permits coupling when one or both of the tractor hydraulic line and equipment hydraulic line are under pressure.

A further object of this invention is to provide a coupling device which prevents the ball valve associated therewith from becoming "frozen" on its valve seat should a surge occur in the hydraulic pressure.

A further object of this invention is to provide a coupling device which permits the rapid coupling of the tractor hydraulic line and the equipment hydraulic line even if the ball valve associated therewith is frozen.

A futher object of this invention is to provide a coupling device which prevents excessive hydraulic fluid from escaping from the coupling upon disconnection of the implement hydraulic line from the tractor hydraulic line.

A further object of this invention is to provide a coupling device having a minimum number of parts.

A further object of this invention is to provide a coupling device which is durable in use.

A further object of this invention is to provide a coupling device which is economical of manufacture.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 4 is a longitudinal sectional view of the coupling device after it has been coupled to the implement hydraulic line and while the tractor and implement hydraulic lines are under pressure;

FIG. 5 is a longitudinal sectional view of the coupling device illustrating the components thereof after the pressure has been taken off of the tractor hydraulic line after the coupling of the tractor hydraulic line and the implement hydraulic line; and FIG. 6 is a longitudinal sectional view of the coupling device illustrating the internal components thereof after the pressure has again been reapplied to the device by the tractor hydraulic system.

Figure 1:
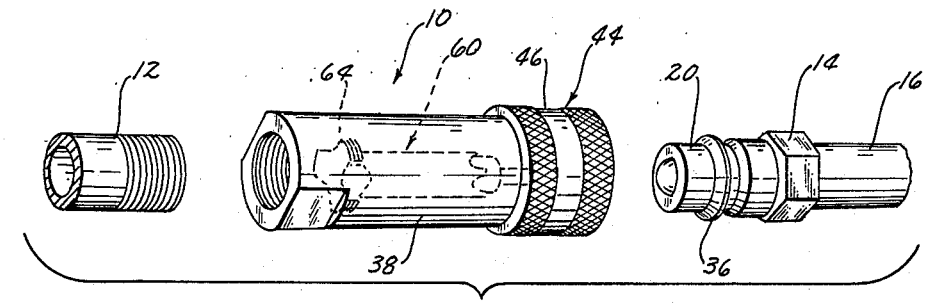
FIG. 1 is an exploded perspective view of the coupling device and the fittings which are connected thereto.

The coupling of this invention is generally designated by the reference numeral 10 and is seen in perspective view in FIG. 1. In FIG. 1, the coupling 10 is adapted to be threadably connected at one end to a nipple 12 which would be operatively connected to a source of hydraulic pressure such as on a tractor or the like. Coupling 10 is also adapted to detachably receive an implement hose fitting which is generally designated by the reference numeral 14 and which would be operatively connected to the implement hydraulic line 16 which is connected to the apparatus to be operated such as a hydraulic cylinder or the like.

Fitting 14 is provided with a longitudinal bore 18 extending therethrough, a protruding reduced diameter portion 20 and an annular valve seat 22 formed at the end of reduced diameter portion 20. A stop means 24 is threadably secured in the interior of bore 18 and includes a substantially triangular shaped, threaded base portion 26 having a hollow sleeve 28 extending therefrom. As seen in the drawings, the free end of sleeve 28 is provided with a plurality of notches or perforations 30 formed therein. Sleeve 28 has a spring 32 mounted thereon which is adapted to yieldably urge ball valve 34 into seating engagement with valve seat 22. Fitting 14 is also provided with an annular ridge 36 extending outwardly from reduced diameter portion 20.

Coupling 10 includes an elongated hollow housing 38 having a longitudinal bore 40 extending therethrough and an internally threaded portion 42 at one end thereof which is adapted to threadably receive nipple 12. The other end of housing 38 is provided with a conventional releasable connection means 44 which is adapted to detachably receive reduced diameter portion 20 of fitting 14 at times. Fitting 14 is attached to connection means 44 by simply moving collar 46 to the left, as viewed in FIG. 3, thereby allowing ridge 36 to move past the retaining balls 48 so that reduced diameter portion is fully inserted into the right end, as viewed in FIG. 3, of housing 38 and so that ridge 36 is to the left or inwardly of balls 48. Collar 46 is then released and the spring means 50 causes collar 46 to be moved to the right thereby causing the balls 48 to be cammed inwardly with respect thereto at a point outwardly of ridge 36 to rigidly effect the connection of fitting 14 and the connection means 44 on housing 38. A conventional O-ring 52 is provided in the interior of housing 38 as illustrated in FIG. 3 to prevent leakage of the hydraulic fluid passed the exterior of fitting 14.

Figure 2:
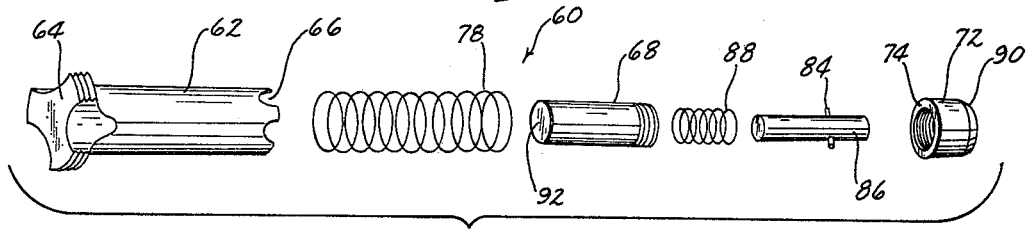
FIG. 2 is an exploded perspective view of the actuator assembly.
Figure 3:
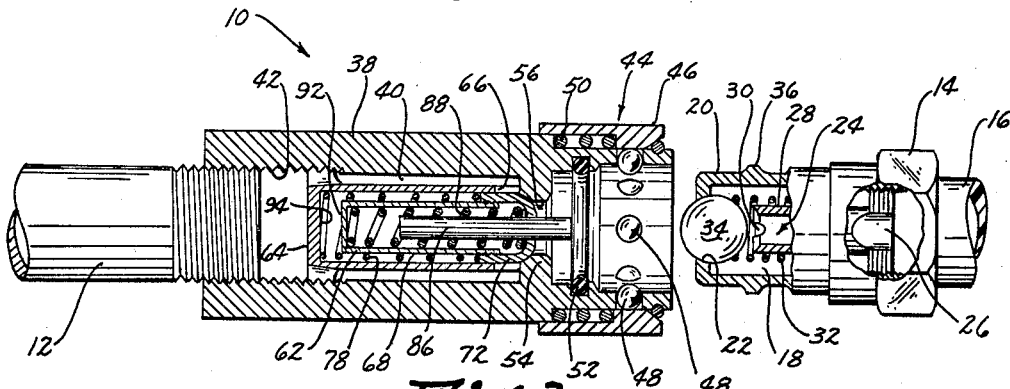
FIG. 3 is a longitudinal sectional view of the coupling prior to the coupling thereof to the implement hydraulic line.

As best illustrated in FIG. 3, housing 38 is provided with a shoulder portion 54 having a central bore 56 extending therethrough. One side of shoulder portion 54 is provided with a seat portion 58 formed therein while the other side of shoulder portion 54 is formed so as to be able to partially receive the protruding portion of ball valve 34 as illustrated in FIG. 4. The check valve actuator assembly is generally designated by the reference numeral 60 and includes a hollow sleeve 62 having a substantially triangular shaped, threaded base portion 64 which is threadably secured to threaded portion 42 in the interior of housing 38. As seen in FIG. 2, the free end of sleeve 62 is provided with a plurality of notches or perforations 66 formed therein.

A cylinder 68 having an internal compartment 70 extending thereinto from one end thereof is slidably mounted in sleeve 62 and has a head portion 72 secured to its outer end by any convenient means. For purposes of description, cylinder 68 and head portion 72 will be collectively described as a cylinder assembly 76. As seen in FIG. 2, the diameter of head portion 72 is greater than the diameter of sleeve 68 which causes a shoulder 74 to be defined at the inner end of head portion 72. Cylinder assembly 76 is slidably movable in sleeve 62 and cylinder 68 is embraced by a spring 78 which yieldably resists the inward movement of cylinder 76 with respect to sleeve 62. As seen in FIG. 3, spring 78 engages shoulder 74 and head portion 72 slidably engages the wall surface of the interior of sleeve 62.

Head portion 72 is hollow and is provided with a bore 80 which is adapted to slidably receive a plunger 82 partially extending therethrough. Plunger 82 has a pin 84 extending therethrough within head portion 72 to limit the outward movement of plunger 82 with respect to head portion 72. The protruding portion 86 of plunger 82 preferably protrudes one-fourth of an inch from head portion 72 in its normal extended condition. A spring means 88 embraces plunger 82 in cylinder 68 to yieldably resist the inward movement of plunger 82 with respect to cylinder 68. As seen in the drawings, one end of spring 88 engages pin 84 while the other end thereof engages the inner end of the compartment 70.

In FIG. 3, the components of the coupling are illustrated in their normal position when the coupling 10 is in communication with the source of hydraulic pressure on the tractor and before the implement hydraulic line had been coupled thereto. In the position of FIG. 3, the tapered outer portion 90 of head portion 72 is in seating engagement with seat portion 58 on shoulder portion 54 and the rearward end 92 of cylinder 68 is approximately one-eighth of an inch from the inner wall surface 94 of sleeve 62. Inasmuch as fitting 14 has not yet been coupled to the coupling 10, plunger 82 will be in its fully extended position as illustrated in FIGS. 3 and 6. The spring 88 has a compression which is greater than the sum of springs 78 and 32. In the position of FIG. 3, head portion 72 is maintained in seating engagement with seat portion 58 by spring 78 and by the hydraulic pressure within sleeve 62 rearwardly of head portion 72. Hydraulic fluid enters the interior of sleeve 62 at a point between head portion 72 and the interior wall surface of sleeve 62 and is assisted in this passage by means of perforation 66. Head portion 72 would be in seating engagement with seat portion 58 even if the hydraulic pressure was not exerted thereon due to the fact that spring 78 will urge head portion 72 into engagement with seat portion 58.

FIG. 4 illustrates the relationship of the components of the coupling 10 and the fitting 14 after the fitting 14 has been connected to the coupling 10 by means of the releasable connection means 44 as previously described. FIG. 4 illustrates the relationship of these components when the implement ball valve 34 is frozen on its valve seat 22. The connection of fitting 14 to coupling 10, while coupling 10 is under pressure, will cause plunger 82 to be moved inwardly approximately one-quarter of an inch with respect to cylinder assembly 76 thereby compressing spring means 88. The force of the hydraulic fluid against head portion 72 will be greater than the force required to compress spring 88 which will thereby cause plunger 82 to be moved inwardly with respect to cylinder assembly 76. Thus, in FIG. 4, the fitting 14 has been coupled to the coupling 10 while the ball valve 34 is frozen and while pressure is supplied to coupling 10. FIG. 4 would also illustrate the relationship of the components when the head portion 72 and the ball valve 34 were frozen on their respective seats.

The next step in the coupling sequence is to remove the hydraulic pressure from the coupling 10 and the relationship of the components of the coupling 10 and fitting 14 are illustrated in FIG. 5 after the pressure has been so removed. Inasmuch as the hydraulic pressure no longer forces head portion 72 into seating engagement with seating portion 58, spring 88 overcomes spring 78 thereby causing cylinder 68 to be moved inwardly with respect to sleeve 62 approximately one-eighth of an inch until the rearward end 92 of cylinder 68 engages the wall surface 94 of sleeve 62. The movement of cylinder assembly 76 with respect to sleeve 62 causes the plunger 82 to move outwardly one-eighth of an inch with respect to head portion 72. Inasmuch as the ball valve 34 is frozen on its valve seat 22, the force of spring 88 against plunger 82 is not sufficient to cause ball valve 34 to be unseated. The next step in the coupling sequence is to reapply the hydraulic pressure to the coupling 10 and the relationship of the components of coupling 10 and fitting 14 are illustrated in FIG. 6 after such pressure has been so reapplied to the coupling 10. The hydraulic pressure is thus applied to ball valve 34 to unseat the same inasmuch as the hydraulic fluid is forced through central bore 56 against ball valve 34. Ball valve 34 is moved inwardly with respect to fitting 14 approximately one-eighth of an inch until it engages the free end of sleeve 28 as best seen in FIG. 6. The inward movement of ball valve 34 permits plunger 82 to assume its fully extended position while the rearward end of cylinder 68 continues to engage the surface 94. Plunger 82 moves outwardly one-eighth of an inch with respect to head portion 72 from its position of FIG. 5 to its position of FIG. 6. Thus, in the position of FIG. 6, the tractor hydraulic line and the implement hydraulic line are effectively connected through bore 56. Ball valve 34 will be maintained against sleeve 28 by the force of spring 88 which insures that there will be a continuous communication between the tractor and implement hydraulic lines. Spring 88 also prevents ball valve 34 from becoming frozen on its valve seat 22 in the event that a surge should occur in the hydraulic pressure within the system. The force of spring 88 is sufficient to resist the seating of ball valve 34 by any surge in the hydraulic fluid pressure. Inasmuch as ball valve 34 is maintained in engagement with sleeve 28, spring 88 will maintain cylinder 68 in the position of FIG. 6 thereby preventing head portion 72 from freezing on seat portion 58 in the event that a surge in the hydraulic pressure should occur within the system. Thus, the structure of the actuator asembly 60 not only permits the coupling of the coupling 10 and the fitting 14 while one or both is under pressure, but also provides a means for unseating frozen ball valve members. The structure of the actuator assembly 60 also prevents head portion 72 and ball valve 34 from becoming frozen on their respective seat portions in the event that a surge in the hydraulic pressure occurs within the system during the operation of the equipments associated therewith.

The fitting 14 is uncoupled from coupling 10 by simply moving collar 46 to the left, as viewed in FIG. 4 thereby permitting the fitting 14 to be removed from the coupling 10. Simultaneously with the uncoupling of fitting 14 from coupling 10, the hydraulic pressure within the coupling 10 will cause cylinder assembly 76 to move from the position of FIG. 6 to the position of FIG. 3 thereby preventing leakage of fluid from the coupling 10. Likewise, ball valve 34 will be simultaneously seated upon its valve seat portion 22 upon the disconnection of the fitting 14 from the coupling 10. It can also be appreciated that the design of the coupling 10 eliminates an excessive waste of hydraulic fluid upon the uncoupling of the fitting 14 and coupling 10. The only fluid that will be lost to the atmosphere upon the uncoupling will be that fluid which is within central bore 56 and shoulder 54. The amount of hydraulic fluid in central bore 56 will be a minute amount when compared to the amounts lost upon the uncoupling of conventional coupling devices.

Thus, from the foregoing it can be seen that the device accomplishes at least all of its stated objectives.

Some changes may be made in the construction and arrangement of my coupling device without departing from the real spirit and purpose of my invention, and it is my intention to cover by my claims, any modified forms of structure or use of mechanical equivalents which may be reasonably included within their scope.

I claim:
1. A coupling device, comprising,
  a housing means adapted to be connected at one of its ends to a source of fluid under pressure and adapted to be detachably connected at its other end to a check valve means which is operatively connected to an apparatus to be powered by said fluid,
  a valve seat portion in said housing adjacent the normal coupled position of said check valve means,
  a hollow guide means mounted within said housing, a movable body member entirely housed and slidably mounted within said guide means for longitudinal movement therein, a valve portion on one end of said body member adapted to engage said valve seat portion, a plunger movably mounted within said movable body member and movably protruding through the end of said body member having said valve portion to engage said check valve means, and resilient means on said body member and said plunger normally urging said aforementioned components outwardly towards said check valve means.

2. The coupling device of claim 1 wherein fluid is freely movable around the exterior of said body member and is freely movable within said body member around the end of said plunger within said body member to permit said aforementioned components to move with respect to said housing means and with respect to each other without substantial interference with entrapped portions of fluid.

3. In a coupling device, comprising,
  a housing means adapted to be detachably connected at one of its ends to a source of fluid under pressure and adapted to be detachably connected at its other end to a check valve means which is operatively connected to an apparatus to be powered by said fluid,
  and actuator means in said housing means having opposite ends and being length adjustable between a maximum length and a minimum length, one of said opposite ends being adapted to operatively engage said check valve means, said maximum length of said actuator means being sufficient to hold said check valve means open, the minimum length of said actuator means being sufficient to permit said check valve means to be closed,
  said housing including a valve seat,
  said actuator means including a hollow guide means mounted in said housing,
  a body member slidably mounted in said guide means,
  a first spring means in said guide means yieldably urging said body member outwardly from said guide means towards said valve seat and said check valve means,
  said body member having a plunger slidably mounted thereon and extending from one end thereof and being movably between extended and retracted positions with respect thereto,
  a second spring means in said body member normally urging said plunger to its extended position and into engagement with said check valve means.

4. A coupling device, comprising,
  a housing means adapted to be connected at one of its ends to a source of fluid under pressure and adapted to be detachably connected at its other end to a check valve means which is operatively connected to an apparatus to be powered by said fluid,
  a valve seat portion in said housing adjacent the normal coupled position of said check valve means,
  a hollow guide means mounted within said housing,
  an actuator means in said housing means, said actuator comprising a longitudinally movable body member with a valve portion on one end thereof adapted to engage said valve seat portion within said housing means, said body member being slidably mounted in said guide means, a plunger movably mounted within said movable body member and movably protruding through the end of said body member having said valve portion to engage said check valve means, and resilient means on said body member and said plunger normally urging said aforementioned components outwardly towards said check valve means, said resilient means comprising a first spring means in said guide means yieldably urging said body member outwardly from guide means towards said valve seat portion and check valve means, said plunger being slidably movable between extended and retracted positions with respect to said body member, and a second spring means in said body member normally urging said plunger to its extended position and into engagement with said check valve means.

5. The device of claim 4 wherein said second spring means has a compressive resistance greater than said first spring means.

6. The device of claim 5 wherein said check valve means includes a ball valve yieldably maintained in seating engagement with a valve seat by a third spring means and wherein second spring means has a compressive resistance greater than the sums of the compressive resistances of said first and third spring means.

7. The device of claim 4 wherein said hollow guide means includes a base portion threadably mounted in the interior of said housing, a sleeve extending from said base portion towards said valve seat and terminating adjacent said valve seat, said sleeve having a plurality of openings formed therein adjacent said valve seat, said first spring means being received by said sleeve.

8. The device of claim 7 wherein said body member has a head portion thereon which is adapted to engage said valve seat portion in said housing, said plunger extending from said head portion and extending through said valve seat.

References Cited

UNITED STATES PATENTS 3,348,575  10/1967  Simak _____ 137—614.05

WILLIAM F. O'DEA, Primary Examiner

HOWARD M. COHN, Assistant Examiner

U.S. Cl. X.R.

137—614.06